US009797170B2

(12) United States Patent
Savant et al.

(10) Patent No.: US 9,797,170 B2
(45) Date of Patent: Oct. 24, 2017

(54) AUTOMOBILE DOOR HANDLE

(75) Inventors: Fiorenzo Savant, Creteil (FR); Daniele Fornengo, Creteil (FR); Marco Savant, Creteil (FR); Antonio Rocci, Creteil (FR); Vittorio Giaccone, Creteil (FR); Anthony Guerin, Creteil (FR); Guillaume Lesueur, Creteil (FR)

(73) Assignee: U-SHIN ITALIA S.P.A., Pianezza (IT)

( * ) Notice: Subject to any disclaimer, the term of this patent is extended or adjusted under 35 U.S.C. 154(b) by 1258 days.

(21) Appl. No.: 13/133,829

(22) PCT Filed: Dec. 18, 2009

(86) PCT No.: PCT/EP2009/067545

§ 371 (c)(1), (2), (4) Date: Aug. 17, 2011

(87) PCT Pub. No.: WO2010/072678

PCT Pub. Date: Jul. 1, 2010

(65) Prior Publication Data

US 2011/0289731 A1 Dec. 1, 2011

(30) Foreign Application Priority Data

Dec. 22, 2008 (IT) .............................. MI2008A2292

(51) Int. Cl.
*G05B 19/00* (2006.01)
*E05B 81/78* (2014.01)

(52) U.S. Cl.
CPC .............. *E05B 81/78* (2013.01); *E05B 81/77* (2013.01); *Y10T 16/458* (2015.01)

(58) Field of Classification Search
CPC ......... E05B 81/78; E05B 81/77; Y10T 16/458
USPC .......................................... 292/336.3; 16/110
See application file for complete search history.

(56) References Cited

U.S. PATENT DOCUMENTS

| | | | | |
|---|---|---|---|---|
| 6,075,294 | A * | 6/2000 | Van den Boom et al. | 307/10.1 |
| 6,431,643 | B2 * | 8/2002 | Grey | B60N 2/002 105/354 |
| 6,998,968 | B2 * | 2/2006 | Garnault | E05B 81/78 340/426.28 |

(Continued)

FOREIGN PATENT DOCUMENTS

| | | |
|---|---|---|
| EP | 1 235 190 A1 | 8/2002 |
| EP | 1 428 961 A2 | 6/2004 |
| EP | 1 518 981 A1 | 3/2005 |

OTHER PUBLICATIONS

International Search Report w/translation from PCT/EP2009/067545 dated Mar. 30, 2010 (4 pages).

*Primary Examiner* — Kristina Fulton
*Assistant Examiner* — Thomas Neubauer
(74) *Attorney, Agent, or Firm* — Osha Liang LLP

(57) ABSTRACT

The present invention relates to an automobile door handle (10), comprising: an interior fitting (2), said interior fitting (2) comprising at least one metal or metallized element; an intermediate means (11) connecting said interior fitting (2) to a reference potential; an attachment means (13, 14) for retaining said interior fitting (2) on said door handle (10); said door handle (10) being characterized in that said intermediate means (11) and said attachment means (13, 14) are arranged such that the attachment of said interior fitting (2) by means of said attachment means (13, 14) involves connecting said interior fitting (2) to said reference potential.

12 Claims, 4 Drawing Sheets

(56) References Cited

U.S. PATENT DOCUMENTS

| | | | | |
|---|---|---|---|---|
| 7,062,945 | B2 * | 6/2006 | Saitoh et al. | 70/278.1 |
| 7,374,319 | B2 * | 5/2008 | Camarota | A47K 3/003 16/110.1 |
| 2002/0125994 | A1 * | 9/2002 | Sandau | G07C 9/00309 340/5.62 |
| 2004/0039511 | A1 * | 2/2004 | Garnault et al. | 701/49 |
| 2008/0216285 | A1 * | 9/2008 | Browne | B60N 3/023 16/110.1 |

* cited by examiner

AUTOMOBILE DOOR HANDLE

The present invention relates to an automobile door handle.

The invention more particularly proposes an external handle for an automobile door, comprising a metal or metalized finishing element.

For some years, automobile door handles have been becoming increasingly interactive and are now included in the increasing range of convenient services offered by automobile manufacturers.

To this end, door handles are known that include electronic means such as locking/unlocking sensors or even proximity sensors detecting the approach of a passenger and thus anticipating the imminent opening of the door.

However, the presence of finishing pieces in the door handles, such as chrome-plated strips used by the automobile manufacturers in order to increase the stylistic effect of the vehicles, may affect the behavior of these sensors whose operating principle is based on an electric or magnetic field variation depending on the type of sensor used.

One example of a proximity sensor, typically used in the door handles, is a capacitive sensor which works by measuring the capacity variation of the sensor when an object enters into the field of the dielectric.

When the metal finishing pieces of the door handle are located in proximity to a sensor, which works according to the above principle, they may cause an at least partial deflection of the dielectric field lines affecting the operation of the sensor. The malfunctioning of the sensor is reflected, for example, in a loss of the detection sensitivity concerning the variation of the capacitance with contact from the hand of the passenger or even in the undesirable extension of the detection area to the rest of the door handle.

In order to remedy these problems, the finishing pieces that include metal elements are set to a reference potential, also called vehicle ground, so as not to produce an electrical potential that interferes with or deflects the dielectric field of the sensor.

Thus, door handles are known that include means for setting to a reference potential that make it possible to connect these metal finishing pieces to the reference potential of the vehicle. These reference potential setting means are notably formed by one end of an electrical wire, linked to the ground, secured by screwing to the finishing piece or even by means of an electrical wire or a connector, linked to the reference potential that is manually inserted into a connector electrically linked to the metal finishing piece.

Regardless of the reference potential setting means used, the known door handles require a particular manual step for connecting the metal element to the reference potential in the assembly method.

Furthermore, these reference potential setting means require a different design for each door handle, left handle and right handle. The design of these means must take into consideration a strong dimensioning tolerance originating from the various elements of a door handle.

Thus, these ground-setting means limit the volume reduction possibilities of the door handles and impose a particular design in structuring the door handles. Furthermore, these means allow only a little change in size, weight, and shape of the door handles.

In this context, the invention aims to provide an automobile door handle that makes it possible to simplify the connection of the metal or metalized finishing pieces to a reference potential of the vehicle when assembling the pieces and that also makes it possible to reduce the volume of the door handle.

To this end, the invention proposes an automobile door handle comprising:

- a finishing piece, said finishing piece comprising at least one metal or metalized element;
- intermediate means providing a connection for said finishing piece to a reference potential;
- fixing means for securing said finishing piece to said door handle;

said door handle being characterized in that said intermediate means and said fixing means are arranged so that the fixing of said finishing piece via said fixing means causes said finishing piece to be set to said reference potential.

The term “finishing piece” should be understood to mean a piece comprising at least one metal or metalized element, an element that can be formed of a metal or metalized material, or a conductive material or even a non-metallic material that has a metallic or metalized surface treatment.

Thus, according to the invention, the automobile door handle makes it possible to rapidly and simply set the finishing piece including a metal element to a reference potential when assembling the finishing piece.

The setting to the reference potential is performed automatically and masked during the assembly of the finishing element on the door handle and requires no manual intervention other than the assembly of the element, for example by clipping.

In addition to the main characteristics that have just been mentioned in the above section, the automobile door handle may have one or more of the following additional characteristics, considered individually or in all technically possible combinations:

- said intermediate means are formed by a conductive polymer;
- said conductive polymer forms a sealing means for said door handle;
- said intermediate means are formed by a metal or metalized lug;
- said finishing piece has a metal or metalized tab providing the connection for said finishing piece with said intermediate means when fixing said finishing piece;
- said finishing piece has a metal or metalized tab cooperating with a spring, said spring providing the connection for said finishing piece with said intermediate means when fixing said finishing piece;
- said intermediate means are formed by a metal or metalized shell and a spring;
- said spring provides the contact between said finishing piece and said metal or metalized shell, during said fixing of said finishing piece;
- said handle includes a proximity sensor;
- said proximity sensor is a capacitive sensor.

Other features and advantages of the invention will become more clearly apparent from the description given below, as a nonlimiting indication, with reference to the appended drawings, in which:

In all the figures, the common elements are given the same reference numbers unless stipulated otherwise.

FIG. 1 is an exploded view representation of an automobile door handle, according to the invention, incorporating means for setting to a reference potential.

Figure 1:
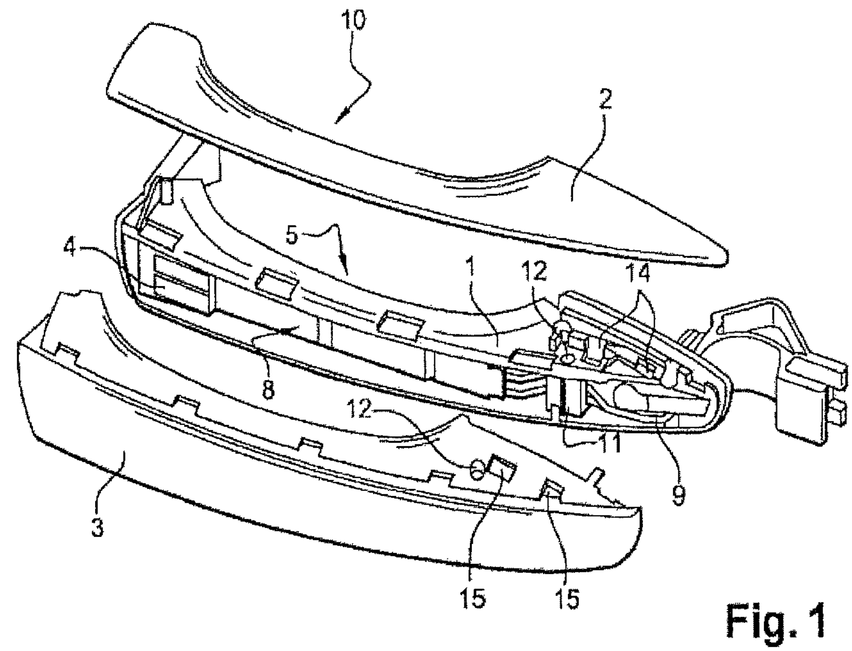
FIG. 1 is an exploded view representation of an automobile door handle according to a first embodiment.

The door handle 10 is an external handle of an automobile door, formed by the assembly of an internal structure 1 comprising fixing means for fixing the door handle 10 to a vehicle door, an external cover 3 and a finishing piece 2 including a metal or metalized element, usually a chrome-plated piece.

The door handle 10 also includes an electronic circuit 8 notably formed by a locking capacitive sensor 4 and an unlocking capacitive sensor 5, the various sensors 4, 5 being interconnected by means of a printed circuit.

The electronic circuit 8 is incorporated inside the internal structure 1 of the door handle 10 and covered by the external cover 3; the external cover 3 being assembled by fitting onto said internal structure 1.

The electronic circuit 8 is powered by electrical power supply wires 9 insulated with an insulating sheath of plastic sheath type.

The electronic circuit 8 is dipped into a material of liquefied plastic type, called filling material, the aim of which is to coat the electronic circuit 8 in order to provide protection for the electronic components, after the latter has hardened.

In order to prevent flows of the filling material along the power supply wires 9, the gland 11 covers the power supply wires 9 of the electronic circuit 8, so that the power supply wires 9 pass through it side to side. The gland 11 is usually a member that makes it possible to provide a seal to the passage of a cable. The gland 11 is advantageously produced by overmolding of the power supply wires 9 but may also be produced by means of a flexible material including an opening for the passage of the power supply wires 9.

Thus, the gland 11 provides a seal between a region of the internal structure 1 capable of receiving the electronic circuit 8 and the rest of the internal structure 1, while allowing for the passage of the power supply wires 9.

According to a first embodiment of the invention, the gland 11 is formed by a material of polymer type that has electrical conductivity properties, such as, for example, an elastomer formed from a mixture of polyurethane and conductive particles or else a mixture of nitrile and conductive particles.

An electrical wire 6 linked to the reference potential 100 of the vehicle is electrically connected to the gland so that the gland 11 has the same reference electrical potential as the electrical wire 6. One advantageous embodiment of the electrical connection between the electrical wire 6 and the gland 11 is the insertion of the stripped electrical wire 6 during the overmolding of the gland 11.

Thus, the setting of the finishing piece 2 to the reference potential is provided by means of a metal or metalized tab 7, belonging to said metal finishing piece 2.

In practice, during assembly of the finishing piece 2 on the internal structure 1 of the door handle 10, the metal tab 7 interacts with the gland 11 so as to create an electrical contact, which consequently causes the finishing piece 2 to be directly set to the same electrical potential as the gland 11, that is to say, to the reference potential of the vehicle, automatically during assembly without external intervention.

The assembly of the metal finishing piece 2 is provided by means of a plurality of fixing tabs 13 arranged so that they are fixed by clipping onto fixing means 14 of the internal structure 1 through openings 15 in the external cover 3.

The term "clipping" should be understood to mean the action of securing a first element to a second element by means of a fixing clip such as fixing tabs.

Figure 2:
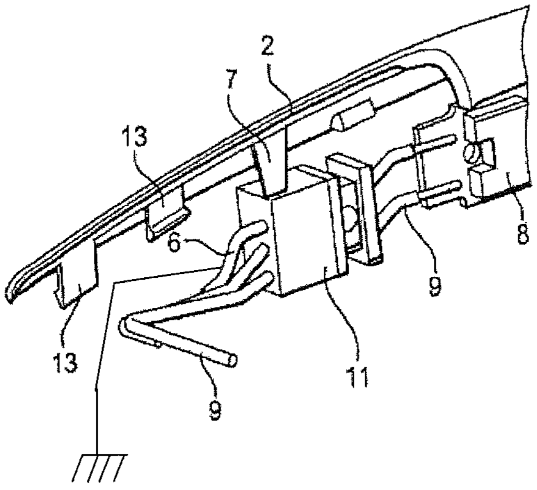
FIG. 2 illustrates a detailed view of a means for setting a door handle to a reference potential according to the first embodiment illustrated in FIG. 1.

FIG. 2 particularly illustrates a method of connection of the finishing piece 2 by means of setting a door handle 10 to a reference potential according to the first embodiment illustrated in FIG. 1.

The finishing piece 2 is set to the reference potential by contact of the metal tab 7 with the gland 11, set to the reference potential by means of the electrical wire 6, when the elements of the door handle 10 are assembled.

The connection between the metal tab 7 and the gland 11 is made possible by the presence of an opening 12, allowing the passage of said metal tab 7, produced both in the internal structure 1 and in the external cover 3.

Figure 3:
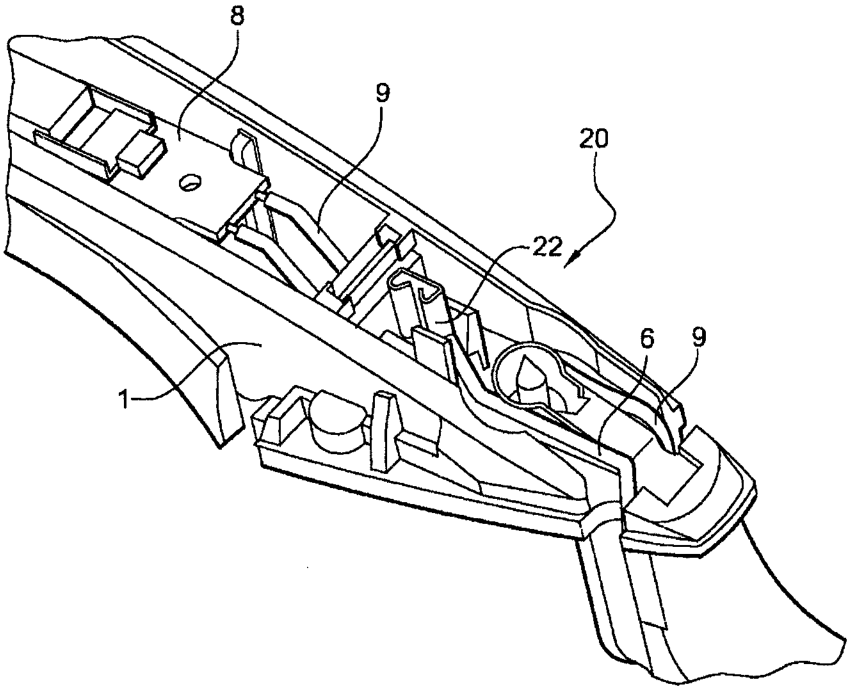
FIGS. 3, 4 and 5 represent different views illustrating a door handle according to a second embodiment.
Figure 4:
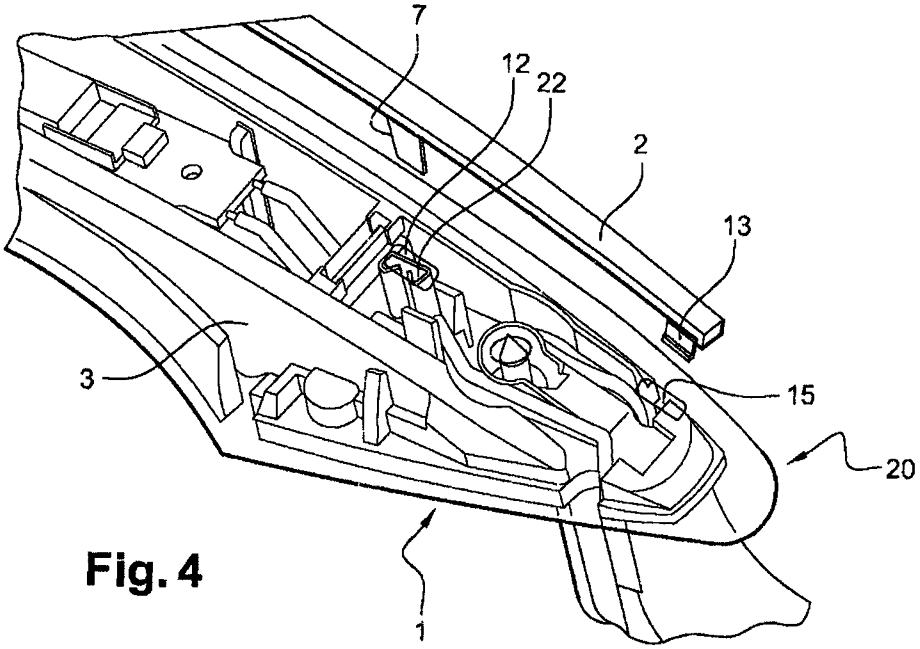
Figure 5:
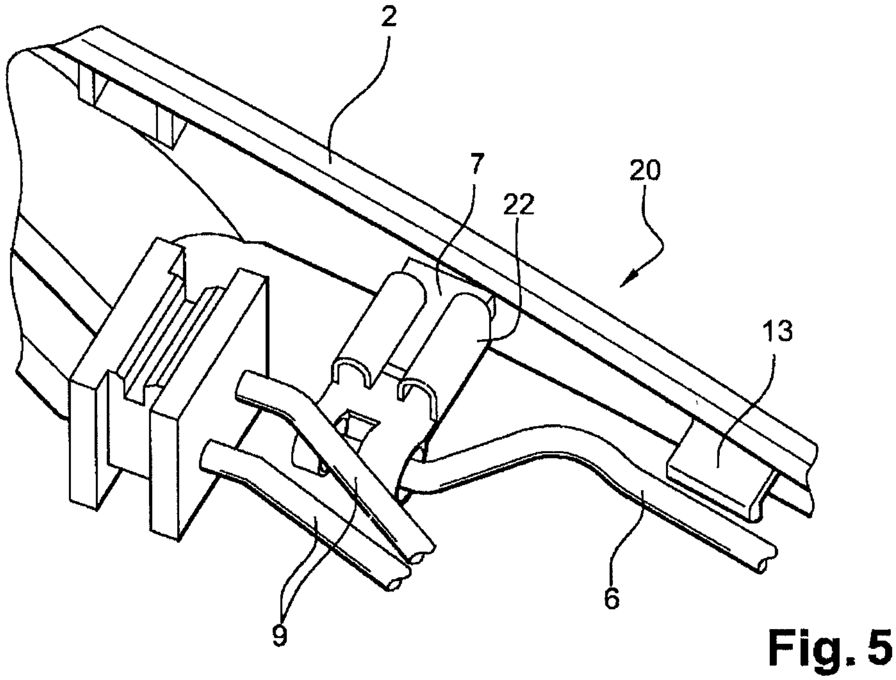

FIGS. 3, 4 and 5 represent different views illustrating a door handle according to a second embodiment of the invention.

FIG. 3 is a variant of the preceding figures, the common means between the door handles 10 and 20 are given the same reference numbers and provide the same functions.

FIG. 3 more particularly illustrates the internal structure 1 of the door handle 20 comprising the electronic circuit 8, the electrical power supply wires 9, and a vehicle reference potential setting means 22 according to a second embodiment.

The door handle 20 is differentiated from the door handle of the preceding figures in that it includes a means for setting the metal finishing piece 2 to the reference potential, said means being formed by a metal or metalized lug 22.

The metal lug 22 is advantageously a flat lug of rectangular shape and including a notch capable of receiving a flat male-type insert. The metal lug 22 is fixed to the end of the electrical wire 6 linked to the reference potential of the vehicle, so that said metal lug 22 is at the reference potential.

The metal lug 22 is kept securely attached to the internal structure 1 by fixing means.

FIG. 4 illustrates the door handle 20 during the assembly of its various component elements. The internal structure 1 and the external cover 3 are represented assembled and the final assembly step consists in fixing the finishing piece 2 by means of fixing tabs 13, a single fixing tab being illustrated in FIG. 4.

During the assembly of the finishing piece 2 on the door handle 20, by the insertion of the fixing tab 13 through the opening 15, the metal tab 7 is inserted into the metal lug 22 and is kept fixed by the latter in order to create an electrical contact once the finishing piece 2 is assembled. Thus, when the finishing piece 2 is assembled on the door handle 20, it is set to the reference potential of the vehicle automatically.

The electrical connection is made without particular intervention and with no prior manual electrical connection step, the metal lug 22 being held in position by the internal structure 1 and by the external cover 3. To this end, the external cover 3 includes an opening forming a chimney suitable for the introduction of the metal lug 22 during the assembly of the external cover 3 on the internal structure 1.

The metal tab 7 is the female part of the electrical connection made with the metal lug 22, the metal lug 22 being the male part. Thus, the shape of the metal tab 7 is produced according to the shape of the metal lug 22, so that it follows the shape of the metal lug 22.

The metal lug 22 can be produced equally in a metal or metalized material, in a conductive material or even in a material having a metal or metalized surface treatment.

FIG. 5 illustrates the finishing piece 2 in the assembled position in which the metal tab 7 is inserted into the metal lug 22. In this position, the finishing piece 2 is set to the reference potential of the vehicle; the metal lug 22 being fixed to the end of the electrical wire 6 linked to the reference potential of the vehicle. The metal lug 22 is set to the reference potential by crimping the end of the electrical wire 6; the end of the electrical wire including an area stripped of insulating sheath in order to allow an electrical contact with the metal lug 22.

Figure 6:
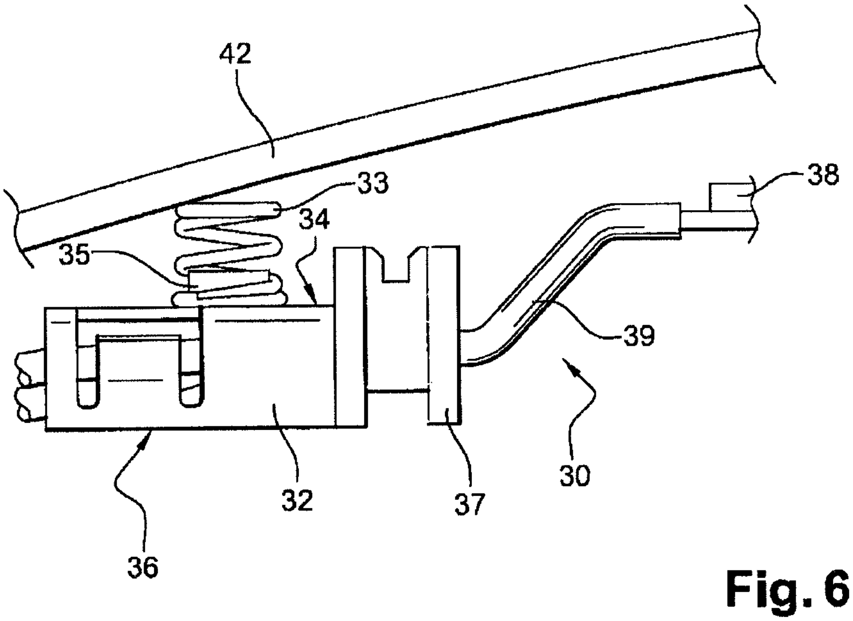
FIG. 6 illustrates a detailed view of a means for setting a door handle to a reference potential according to a third embodiment.

FIG. 6 illustrates a detailed view of a reference potential setting means 36 of a door handle 30 according to a third embodiment.

The door handle 30, according to this third embodiment, is an external handle of an automobile door, formed by the assembly of an internal structure having fixing means for fixing the door handle 30 to a vehicle door, an external cover, and a finishing piece 42 including a metal or metalized element, usually a chrome-plated piece.

The door handle 30 also includes an electronic circuit notably formed by capacitive sensors connected by means of a printed circuit.

The electronic circuit 38 is incorporated inside the internal structure of the door handle 30 and covered by the external cover; the external cover being assembled by fitting onto said internal structure.

The electronic circuit 38 is powered via electrical power supply wires 39 insulated by an insulating sheath of plastic sheath type.

The electronic circuit 38 is dipped into a material of liquefied plastic type, called filling material, the aim of which is to coat the electronic circuit 38 in order to provide protection for the electronic components, after the latter has hardened.

In order to avoid flows of the filling material along the power supply wires 39, a gland 37 covers the power supply wires 39 of the electronic circuit 38, so that the power supply wires 39 pass through it from side to side. The gland 37 is usually a member that makes it possible to provide a seal for the passage of a cable. The gland 37 is advantageously produced by overmolding of the power supply wires 39, but may also be produced by means of a flexible material including an opening for the passage of the power supply wires 39.

Thus, the gland 37 provides a seal between a region of the internal structure suitable for receiving the electronic circuit 38 and the rest of the internal structure while allowing for the passage of the power supply wires 39.

The door handle 30, according to this third embodiment, includes a reference potential setting means 36 formed by a compression spring 33 and a metal or metalized shell 32.

The U-shaped metal shell 32 is arranged in the internal structure where it is kept securely attached by fixing means of fixing tab type that fit into openings of the shell 32 provided for this purpose.

The metal shell 32 includes a U-shaped tab suitable for crimping or soldering to the end of an electrical wire set to the reference potential of the vehicle, so that the metal shell 32 is set to the reference potential.

The contact between the metal shell 32 and the finishing piece 42 is produced by means of a compression spring 33 during the assembly of said finishing piece 42 by means of fixing tabs.

The assembly of the metal or metalized finishing piece 42 is provided by means of a plurality of fixing tabs arranged so that they are fixed by clipping onto fixing means of the internal structure through openings of the external cover.

The term "clipping" should be understood to mean securing a first element onto a second element by means of fixing clips such as fixing tabs.

The spring 33 bears on a contact region 34 of the metal shell 32 and is held in position by means of a cylindrical protuberance 35 on which the spring 33 is force-fitted.

The spring 33 is a spring made of a material capable of providing an electrical connection under a compression stress.

Thus, the setting of the finishing piece 42 to the reference potential is done automatically when it is assembled on the door handle 30, the electrical connection of the finishing piece 42 to the metal shell 32 being provided by their respective contact with the spring 33. The compression of the spring 33 makes it possible to ensure a constant contact between the shell 32 and the finishing piece 42, once the finishing piece 42 is assembled on the door handle 30.

The metal shell 32 and the spring 33 are made of a material, and/or include a surface treatment, that makes it possible to withstand the corrosion-resistance requirements imposed by the automobile manufacturer.

Figure 7:
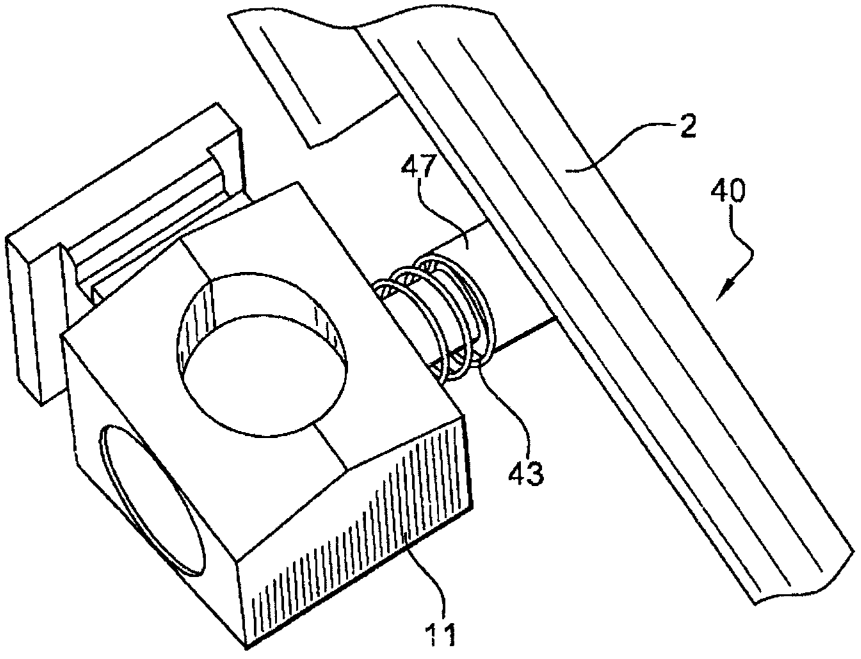
FIG. 7 illustrates a detailed view of a means for setting a door handle to a reference potential according to a fourth embodiment.

FIG. 7 illustrates a detailed view of a reference potential setting means of a door handle 40 according to a fourth embodiment.

FIG. 7 is a variant of the preceding figures, the common means between the door handles 40 and 10 are given the same reference numbers and provide the same functions.

According to this fourth embodiment, the setting of the finishing piece 2 to the reference potential is provided by means of a gland 11, described previously in FIGS. 1 and 2, and by means of a spring 43 providing the electrical contact between the gland 11 and the finishing piece 2. The spring 43 is a compression spring force-fitted onto a metal or metalized tab 47 of the finishing piece 2, so that it is held in position during the assembly of the finishing piece 2 on the internal structure of the door handle.

The spring 43 is a spring made of a material capable of providing an electrical connection under a compression stress.

During the assembly of the finishing piece 2 on the internal structure of the door handle 40, the spring 43 interacts with the gland 11 by compression so as to create an electrical contact, the consequence of which is to directly set the finishing piece 2 to the same electrical potential as the gland 11 by means of the metal tab 47.

Thus, the finishing piece 2 is set to the reference potential of the vehicle automatically during assembly without external intervention.

In a manner similar to the preceding embodiments, the assembly of the metal finishing piece 2 is done by means of a plurality of fixing tabs arranged so that they are fixed by clipping onto fixing means of the internal structure.

It will be noted that the metal or metalized pieces, or pieces including a metal or metalized finishing, of the invention must satisfy the corrosion-resistance requirements imposed by the automobile manufacturers.

Thus, according to the invention, the automobile door handle makes it possible to rapidly and simply set a finishing element including a metal or metalized element to a reference potential in order to avoid disturbing the proximity sensors present in the door handle.

The setting to the reference potential is done automatically and blind when the finishing element is assembled on the door handle and requires no manual intervention other than the assembly of the element, for example by clipping.

The door handle according to the invention makes it possible to simplify the procedure for assembling the finishing element on the assembly line and to reduce the time allotted for the assembly of the door handle on the vehicle.

The grounding means of the door handles according to the invention can be used equally on a right door or on a left door and do not require a different design for each door of the vehicle; the same elements comprising the grounding means being able to be used equally for each door, thus limiting the references present on the assembly line.

The invention has been described in particular for a door handle; however, the invention is equally applicable for any vehicle element that includes proximity sensors and a metal or metalized element that has to be set to a reference potential.

The other advantages of the invention are notably as follows:

- guaranteed protection of the ground electrical wire against the ingress of water;
- the possibility of removing the finishing piece if necessary;
- a reduction of the internal volume provided for the grounding means.

The invention claimed is:

1. An automobile door handle configured to be pulled for opening an automobile door, the handle comprising:

- an internal structure attached to the automobile door;
- an external cover fitting onto the internal structure, the external cover forming a first surface of the handle, covering the internal structure in a region where the handle is gripped when opening the automobile door;
- a finishing piece that forms a second surface of the handle, covering the internal structure in the region where the handle is gripped when opening the automobile door, said finishing piece comprising at least one metal or metalized element;
- an electrical conductor configured to provide an electric reference potential of the automobile to said finishing piece,
- wherein the finishing piece comprises mechanical clips that engage with the internal structure to fixate the finishing piece to the internal structure;
- wherein at least one of the mechanical clips protrude through an opening in the external cover to engage with the internal structure; and
- wherein clipping of the finishing piece to the internal structure establishes electrical contact between the finishing piece and the electrical conductor.

2. The automobile door handle as claimed in claim 1, wherein said electrical conductor is formed by a conductive polymer.

3. The automobile door handle as claimed in claim 2, wherein said conductive polymer forms a sealing means for said door handle.

4. The automobile door handle as claimed in claim 1, wherein said electrical conductor is formed by a metal or metalized lug.

5. The automobile door handle as claimed in claim 1, wherein said finishing piece has a metal or metalized tab providing the connection for said finishing piece with said electrical conductor when fixing said finishing piece.

6. The automobile door handle as claimed in claim 1, wherein said finishing piece has a metal or metalized tab cooperating with a spring, said spring providing the connection for said finishing piece with said electrical conductor when fixing said finishing piece.

7. The automobile door handle as claimed in claim 1, wherein said electrical conductor is formed by a metal or metalized shell and a spring.

8. The automobile door handle as claimed in claim 7, wherein said spring provides the contact between said finishing piece and said metal or metalized shell, during said fixing of said finishing piece.

9. The automobile door handle as claimed in claim 1, further comprising a proximity sensor.

10. The automobile door handle as claimed in claim 9, wherein said proximity sensor is a capacitive sensor.

11. The automobile door handle as claimed in claim 2, wherein the electrical conductor comprises a gland.

12. The automobile door handle as claimed in claim 4, wherein said finishing piece has a metal or metalized tab providing the connection for said finishing piece with said electrical conductor when fixing said finishing piece.

* * * * *